United States Patent [19]

Carpenter

[11] Patent Number: 5,320,673

[45] Date of Patent: * Jun. 14, 1994

[54] DISPERSANTS FOR PIGMENTS IN WATERBORNE COATINGS COMPOSITIONS

[75] Inventor: Clint W. Carpenter, Royal Oak, Mich.

[73] Assignee: BASF Lacke+Farben Aktiengesellschaft, Munster, Fed. Rep. of Germany

[ * ] Notice: The portion of the term of this patent subsequent to Oct. 20, 2009 has been disclaimed.

[21] Appl. No.: 963,499

[22] Filed: Oct. 19, 1992

Related U.S. Application Data

[63] Continuation-in-part of Ser. No. 883,086, May 15, 1992, Pat. No. 5,156,677.

[51] Int. Cl.$^5$ ............................................. C09C 1/62
[52] U.S. Cl. .................. 106/404; 106/14.12; 106/14.15; 106/287.17; 106/287.23; 106/287.25; 106/287.29; 106/401; 106/403; 106/499
[58] Field of Search ............. 106/14.12, 14.15, 287.17, 106/287.23, 287.24, 287.25, 287.29, 401, 403, 404, 499

[56] References Cited

U.S. PATENT DOCUMENTS

| | | | |
|---|---|---|---|
| 4,213,886 | 7/1980 | Turner | 260/29.6 |
| 4,350,535 | 9/1982 | Ishijima et al. | 106/308 |
| 4,565,716 | 1/1986 | Williams, Jr. et al. | 427/216 |
| 4,675,358 | 6/1987 | Frangou | 524/439 |
| 4,750,940 | 6/1988 | Higashi et al. | 106/290 |
| 5,039,343 | 8/1991 | Umeda et al. | 106/404 |
| 5,057,156 | 10/1991 | Kuwajima et al. | 106/403 |

Primary Examiner—Helene Klemanski
Assistant Examiner—Scott L. Hertzog
Attorney, Agent, or Firm—Anne G. Sabourin

[57] ABSTRACT

A compound is described that is useful as a dispersant for inorganic pigments and metallic flake pigments in waterborne coatings. The compound comprises a polymeric backbone having a pigment-interactive substituent and a stabilizing substituent.

The pigment-interactive substituent has at least one functionality selected from the group consisting of

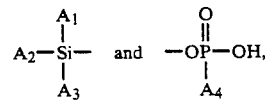

wherein $A_1$, $A_2$, $A_3$, and $A_4$ are as defined herein.

The stabilizing substituent includes the structure

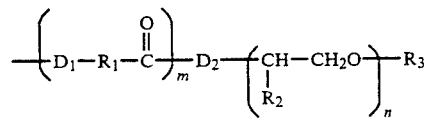

wherein $D_1$, $D_2$, $R_1$, $R_2$, $R_3$, m, and n are as defined herein.

21 Claims, No Drawings

DISPERSANTS FOR PIGMENTS IN WATERBORNE COATINGS COMPOSITIONS

BACKGROUND OF THE INVENTION

This is a continuation-in-part of U.S. application Ser. No. 07/883,086, filed May 15, 1992, and now U.S. Pat. No. 5,156,677.

The present invention relates to compounds that are useful for dispersing pigments in waterborne coatings. In particular, the dispersant compounds of the invention may be utilized to disperse inorganic pigments or to modify the surface of metallic particles, such as metallic flake pigments, for use in waterborne coatings. The invention also provides coatings and coated articles formed from compositions containing the dispersant compounds and the inorganic pigments dispersed or the metallic flake pigments surface-modified with such compounds.

One particular application is in waterborne automotive coating compositions, such as topcoats or primers. Topcoat automotive coatings may utilize a single, uniformly pigmented layer. Alternatively, they may have two distinct layers: a lower, highly pigmented layer and an upper layer with little or no pigmentation. The two-layer coating is known in the industry as basecoat/-clearcoat or color plus clear coat. Basecoat/clearcoat coatings impart a high level of gloss and depth of color that result in a particularly appealing appearance. Inorganic pigments may be utilized to achieve the desired color. Metallic flake pigments may be incorporated to give the coating a metallic effect.

Concerns over organic solvent emissions during application of paints have resulted in the introduction of waterborne automotive paints, especially waterborne basecoat paints. However, dispersion and stabilization of pigments in water-based systems are more difficult than in the previous, solvent-based technology.

One method of dispersing a pigment for a waterborne coating is to use a grinding resin, as described in U.S. Pat. No. 4,794,147 or in European Patent Application No. 91303935.0 (publication number 0 459 634 A2). Such methods require lengthy processing times and yield dispersions having relatively poor color development and stability, compared to solvent-based paints. Also, the ratio of pigment solids to resin solids by weight (often referred to as the pigment to binder ratio) is relatively low, compared to ratios that can be achieved using the compounds of the present invention. A higher pigment to binder ratio is desirable because it increases manufacturing efficiency.

In another method, described in U.S. Pat. No. 5,013,770, micaceous pigments are dispersed using a monomeric silane-functional dispersant. However, small particle size pigments are more easily and efficiently dispersed using the polymeric dispersants of the present invention.

The new waterborne technology has the further disadvantage in that the aqueous medium is corrosive to the metallic flake pigments used to impart a popular metallic effect to the coating. When a paint with oxidized metallic flake pigments is coated onto a substrate, the coating shows discoloration and diminished metallic effect. Furthermore, oxidation of the metallic surfaces by the water results in the evolution of hydrogen gas, which may accumulate in storage of the paint.

Considerable work has been done in the industry to try to protect the metal surfaces from the water. The metallic flake may be treated with inorganic reagents, such as chromates, according to the process of Kondis (U.S. Pat. No. 4,693,754); or the flake may be first encapsulated with a silica coating and then treated with a carboxylic chromic chloride as disclosed by Batzar (U.S. Pat. No. 3,954,496). However, these treatments are known to be detrimental to the appearance of the flake in a coating, either from discoloration or decreased luster. The toxicity of the inorganic reagents used in such treatments is also a concern.

Organic phosphate or phosphite treatments have been used, including the simple phosphate esters of Williams, Jr. et. al. (U.S. Pat. No. 4,565,716), such as mixtures of mono- and di-phosphates of monoalcohols like octylphenol, ethylene glycol monobutyl ether, or octanol; and polymeric esters like those disclosed by Frangou (U.S. Pat. No. 4,675,358). However, at the levels required to give protection comparable to the inorganic treatments, the coating may exhibit loss of adhesion to other layers or a cohesive failure within the coating layer.

A method of coating an aluminum flake with a monoethylenically unsaturated silane, said silane then being reacted with acrylic monomers, is disclosed by Turner (U.S. Pat. No. 4,213,886). However, this method does not provide for a well-dispersed flake pigment in the aqueous paint composition. The poor dispersion of the flake pigment diminishes the metallic effect in the coating prepared therefrom.

It has been discovered that metallic flake pigments that are surface-modified with the compounds of the present invention are particularly resistant to oxidation in waterborne paints with minimal discoloration or diminution of the metallic effect in the coating. It has also been discovered that metallic flake pigments surface-modified or inorganic pigments dispersed according to the present invention form superior dispersions in water in comparison to pigments using previously-known methods of dispersion. This superior dispersion in the waterborne paint composition results in a coating with improved color development and/or an enhanced metallic effect.

Moreover, when the compounds of the present invention are used at levels necessary to disperse the pigment or to prevent oxidation of the metallic pigment, the compounds do not cause any loss of adhesion to other layers or any cohesive failure within the coating layer.

Furthermore, the compounds of this invention provide significant and unexpected processing advantages in the dispersion of inorganic pigments, including reduced milling times, pigment paste dispersions with higher pigment concentrations, reduced volatile organic content, and greater formulating latitude when the pigment paste dispersions are incorporated into paint compositions.

SUMMARY OF THE INVENTION

The present invention provides, in one aspect, a compound useful as a dispersant for inorganic pigments and metallic flake pigments in water; said compound having a polymeric backbone, and on the polymeric backbone a pigment-interactive substituent and a stabilizing substituent.

The pigment-interactive substituent has at least one functionality selected from the group consisting of

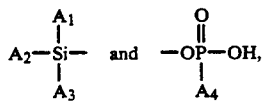

wherein $A_1$, $A_2$, $A_3$, and $A_4$ are each independently hydroxy, alkyl of one to ten carbon atoms, alkoxy of one to ten carbon atoms, alkoxyalkoxy of two to ten carbon atoms, alkanoyloxy of two to ten carbon atoms, or halogen, with the proviso that $A_1$, $A_2$, and $A_3$ may not all be alkyl.

The stabilizing substituent includes the structure (I):

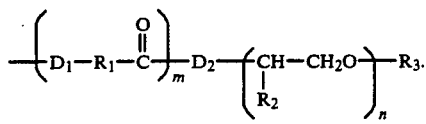

In this structure, each independently —O— or —$NA_5$—, where $A_5$ is hydrogen or alkyl of one to twelve carbon atoms. $R_1$ is a divalent radical selected from straight or branched alkylenes of three to thirty carbon atoms. The segment represented by ($D_1$—$R_1$—C(=O)—) is therefore either polyester or polyamide and has a degree of polymerization of m, m being an integer from zero to one thousand. When metallic particles are surface-modified with the compound of the invention, m must be at least one. $R_2$ is hydrogen or a mixture of hydrogen and alkyl of one to eight carbon atoms.

That part of the molecule represented by ($CH(R_2)CH_2O$—)n is therefore either polyethylene oxide or a polyethylene oxide/polyalkylene oxide copolymer, having a degree of polymerization of n, n being an integer from one to one thousand. $R_3$ is alkyl of one to thirty carbon atoms.

The compounds of the invention provide an effective means of dispersing inorganic or metallic flake pigments. Exceptional stability and color development is achieved. The inorganic pigments are preferably dispersed first in an aqueous concentrate containing the pigment(s) and compound(s) of the invention, said concentrate being commonly called a pigment grind or pigment paste. The pigment pastes are mixed with such ingredients as polymers, crosslinkers, and additional solvents (including additional water) to form an aqueous coating composition.

Inorganic pigments may be used, for example, as colorants, extenders, or corrosion inhibitors. Many inorganic pigments are known to be useful in coatings compositions, including metal oxides, chromates, molybdates, phosphates, and silicates. Particular, non-limiting examples of inorganic pigments that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ammonium ferrocyanide (Prussian blue), ultramarine, lead chromate, lead molybdate, and mica flake pigments. The ease of dispersion of these pigments using the compounds of the invention allows for reduced processing times and increased pigment concentrations in forming the pigment pastes. The pigment pastes formed according to the present invention also require a very low level of organic solvents or cosolvents in comparison to pigment pastes previously used. The combination of increased pigment concentration and reduced organic cosolvents in the pigment paste allow for greater latitude in formulating a coating composition, especially a coating composition having a lower content of volatile organic compounds.

Additionally, an increased concentration of pigment in the pigment paste and reduced milling times improves manufacturing efficiency and reduces costs associated with the manufacture of the pigment paste dispersion.

The compounds of the present invention are also particularly effective for modification of metal surfaces. The metal particle surface-modified with the compound of the invention may be, for example, aluminum, gold bronze (copper-zinc alloys), copper, nickel, magnesium, zinc, and alloys of these. In one particular embodiment the metal particle is a metallic flake pigment. The metallic flake pigment surface-modified with the compound of the invention experiences improved stability in aqueous environments and resistance to oxidation, with the proviso that m is not zero, compared to metallic flake pigment without surface modification. The compound of the invention also improves dispersion of metallic flake pigments in aqueous compositions. The terms "surface modification" and "surface-modified" encompass any and all associations, interactions, or reactions between the metallic surface and the compound in accordance with the disclosed invention.

The present invention also provides a coated article that is a coating on a substrate, wherein the coating contains the compound of the invention or a polymeric network containing a residue of the compound, along with at least one of an inorganic pigment or a metallic flake pigment surface-modified with the compound. The coating has excellent appearance and adhesion properties.

DETAILED DESCRIPTION OF THE INVENTION

The pigment-interactive substituent of the invention has a silyl or phosphate functionality, as described hereinabove.

The stabilizing substituent has an optional hydrophobic portion, represented by ($D_1$—$R_1$—C(=O)—)m, and a terminal hydrophilic portion, represented by ($CH(R_2)CH_2O$—)$_n R_3$. The stabilizing substituent may be formed by the reaction of a lactone, lactam, amino acid, or hydroxy acid, or a polymer formed of any of these, with an alkoxy poly(oxyalkylene) alcohol or with an alkoxy poly(oxyalkylene) amine. The polyester or polyamide residue, represented by ($D_1 R_1 C$(=O)—), has a degree of polymerization of m, m being an integer from zero to one thousand. When the compound is used as a dispersant for inorganic pigment, m is preferably 0 to 200, more preferably 0 to 50, and it is especially preferred that m be zero. When metallic particles such as metallic flake pigments are surface-modified with the compound, m must be at least one; it is preferred that m be from 10 to 200, and in a particularly preferred embodiment m is from 20 to 50. $R_1$ is a divalent radical selected from straight or branched alkylenes of three to thirty carbon atoms. Preferably, $R_1$ has three to twenty carbon atoms. In a more preferred embodiment $R_1$ is a straight chain alkylene of five carbon atoms.

The stabilizing substituent may be formed by polymerizing, for example, e-caprolactone onto an alkoxy poly(oxyalkylene) alcohol. In a particularly preferred embodiment, one equivalent of the alkoxy poly(oxyalkylene) alcohol is reacted with from 20 to 50 equivalents of e-caprolactone. The polymerization temperatures are typically between 100° C. and 150° C. Any of a number of catalysts known to be useful in esterification reactions may be utilized, such as tetrabutyl titanate or titanium diisopropoxide-bis(2,4-pentanedionate). For example, tetrabutyl titanate may be used advantageously at levels of from 0.05% to 0.5%, based on weight of reactants. The reaction may be done in the presence or absence of solvent. Substituents using lactams, such as caprolactam, hydroxy acids, such as 12-hydroxystearic acid, or amino acids, such as 12-aminododecanoic acid, may be prepared in a similar manner using methods well-known to the art.

The alkoxy poly(oxyalkylene) alcohol or alkoxy poly(oxyalkylene) amine employed can be formed by the alkoxylation of monohydric alcohols with ethylene oxide or mixtures of ethylene oxide with other epoxides of up to ten carbon atoms, such as propylene oxide or butylene oxide. $R_2$ is thus either hydrogen or a mixture of hydrogen and alkyls of one to eight carbon atoms. It is particularly advantageous for $R_2$ to be either hydrogen or a mixture of hydrogen and alkyls of one to three carbon atoms. The polymerization may be terminated by addition of an aziridine, such as propylene aziridine, to form the alkoxy poly(oxyalkylene) amine. The residue of the alkoxy poly(oxyalkylene) alcohol or amine contained in the compound, represented by $D_2(CH(R_2)CH_2O-)_nR_3$, is either alkoxy polyoxyethylene or an alkoxy polyoxyethylene/polyoxyalkylene copolymer, having a degree of polymerization of n, n being an integer from one to one thousand. Preferably, n is an integer from 20 to 200; more preferably, from 40 to 70. $R_3$ is an alkyl of one to thirty carbon atoms. $R_3$ is preferably an alkyl of one to ten carbon atoms. In a particularly preferred embodiment $R_3$ is hydrogen and $R_3$ is methyl.

The polymeric backbone may be any polymer to which the substituents mentioned may be attached. Such polymers as acrylics, vinyls, urethanes, polyesters, alkyds, epoxies and other polymers known to be useful in coatings compositions are preferred. Of these, acrylic, vinyl, urethane, and polyester polymers are more preferred. Acrylic polymers are particularly preferred. The term "polymeric" is meant to include oligomeric materials also. Linear polymeric backbones are preferred.

One or both substituents may be incorporated during the polymerization reaction forming the polymer backbone. For example, the polymer may be formed by copolymerization of an ethylenically unsaturated substituent monomer containing a pigment-interactive substituent having at least one functionality selected from the group consisting of:

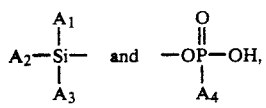

and/or an ethylenically unsaturated substituent monomer containing Structure I, with at least one other ethylenically unsaturated monomer.

Suitable ethylenically unsaturated substituent monomers containing one of the pigment-interactive groups described include 2-methacryloyloxyethyl phosphate, 2-acryloyloxyethyl phosphate, 2-methacryloyloxypropyl phosphate, (hydroxy)phosphinylmethyl methacrylate, vinyltrimethoxysilane, vinyltrichlorosilane, vinyltriethoxysilane, and gamma-methacryloxypropyltrimethoxysilane.

Suitable ethylenically unsaturated substituent monomers containing Structure I may be formed, for example, by reaction of a hydroxy-functional compound containing Structure I with an ethylenically unsaturated anhydride such as maleic anhydride, or with an ethylenically unsaturated isocyanato compound such as isocyanatoethyl methacrylate or meta-isopropenyl-$\alpha,\alpha$-dimethylbenzyl isocyanate. Meta-isopropenyl-$\alpha,\alpha$-dimethylbenzyl isocyanate is available from American Cyanamid Company, Wayne, NJ under the trade name "TMI ® (Meta) unsaturated aliphatic isocyanate," and is described in American Cyanamid Company's publication "TMI ® (Meta) unsaturated aliphatic isocyanate", publication number 2-849 1/88.

Suitable other ethylenically unsaturated monomers that may be used in forming a copolymer with the substituent monomer(s) include $\alpha,\beta$-olefinically unsaturated monocarboxylic acids containing 3 to 5 carbon atoms and their esters or nitriles or amides; $\alpha,\beta$-olefinically unsaturated dicarboxylic acids containing 4 to 6 carbon atoms and their anhydrides and esters; vinyl esters, vinyl ethers, vinyl ketones, vinyl amides, and vinyl compounds of aromatics and heterocycles. Representative examples include acrylic, methacrylic, and crotonic acid; acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; acrylates or methacrylates having hydroxy, isocyanato, or other functional groups, such as hydroxyalkyl acrylates and methacrylates, glycidyl esters of methacrylic or acrylic acid such as glycidyl methacrylate, and aminoalkyl esters of methacrylic or acrylic acid like N,N-dimethylaminoethyl (meth)acrylate; fumaric, maleic, and itaconic acids and anhydrides and their esters, like maleic aid dimethyl ester and maleic acid monohexyl ester; vinyl acetate, vinyl propionate, vinyl ethyl ether, and vinyl ethyl ketone; styrene, a-methyl styrene, vinyl toluene, and 2-vinyl pyrrolidone.

The copolymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

The polymerization reaction may be, for example, a free radical polymerization carried out in solution using such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents. Preferred solvents are ketones.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization is usually carried out at temperatures from about 20° C. to about 200° C., preferably from 90° C. to 170° C. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

The solvent or solvent mixture is generally heated to the reaction temperature and the monomers and initiator(s) are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed to ensure complete conversion. The acrylic copolymer preferably has a weight average molecular weight of at least 1000, and more preferably from 2000 to 50,000. The weight average molecular weight is determined by gel permeation chromatography using polystyrene standards.

Alternatively, the polymer backbone may be formed to include functionality reactive toward groups of the pigment-interactive and stabilizing substituents. The polymer functionality and the groups of the substituents are reacted together to form linking groups between polymer and substituents. The functionality is preferably isocyanate, epoxy, acid, acid anhydride, or hydroxy. It is preferred that the functionality be either isocyanate or acid anhydride.

In yet a different reaction scheme, either the pigment-interactive substituent or the stabilizing substituent may be included during the polymerization of the polymer backbone, while the other is adducted onto a polymer functionality afterward.

In another aspect of the invention, the compound has the particular structure (II):

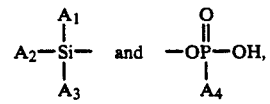

wherein $A_1$, $A_2$, $A_3$, and $A_4$ are as previously defined. $R_4$ is a divalent radical selected from straight or branched alkylenes of one to twelve carbon atoms. $D_3$ is either a divalent radical selected from the group consisting of —O—, —NA$_6$, and —S—, or a trivalent radical of the formula

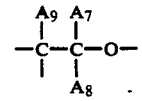

where $A_6$, $A_7$, $A_8$, and $A_9$ are each independently hydrogen or alkyl of one to twelve carbon atoms. $R_5$ is hydrogen or a covalent bond with $D_3$, with the proviso that $R_5$ is only a covalent bond with $D_3$ when $D_3$ is a trivalent radical. $R_6$ is the polymeric backbone, previously described hereinabove. The numbers of substitutions of each kind on the polymeric backbone are represented by j and k, where j and k are integers, each independently being one to fifty.

In the formula of structure (II), the pigment-interactive substituent, $XR_1D_1$, has a terminal functionality, X, previously described hereinabove. The stabilizing substituent contains the Structure I. The pigment-interactive substituent is linked to the polymeric backbone via the linking group —C(=O)—NR$_5$—. The stabilizing substituent is linked to the polymeric backbone via the linking group —C(=O)—NH—.

The polymeric backbone is preferably acrylic or urethane. The polymeric backbone is either synthesized including substituent monomers that have the illustrated linking groups, or the polymeric backbone when synthesized includes thereon at least two isocyanate groups or latent isocyanate groups. The latter may be accomplished by either copolymerizing into the polymeric backbone a monomer with isocyanate or latent isocyanate functionality, or by reacting a group with isocyanate or latent isocyanate functionality onto the polymer. The reaction of the isocyanate or latent isocyanate functionality with an isocyanate-reactive functionality of the pigment-interactive substituent or the stabilizing substituent forms the appropriate linking group.

Illustrative examples of isocyanate or latent isocyanate functional urethane backbones are urethane polymers with terminal isocyanate or latent isocyanate func-

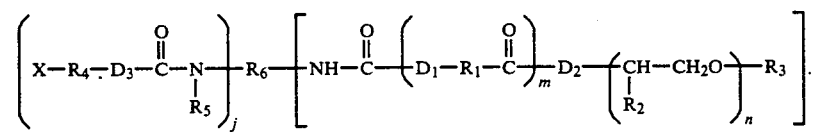

Structure I is contained in the compound shown as Structure II, and $D_1$, $D_2$, $R_1$, $R_2$, $R_3$, m, and n are as previously defined. X is the pigment-interactive functionality, selected from the group tionality. The urethane polymers may be synthesized by known techniques, such as bulk polymerization or, preferably, solution polymerization, from polyisocyanates and polyfunctional compounds reactive with polyisocyanates, including, for example, polyols, polyamines, and aminoalcohols; with the proviso that the sum of equivalents of isocyanate and latent isocyanate groups used exceeds the equivalents used of polyfunctional compounds reactive with polyisocyanates. The polyisocyanate may be, for example, isophorone diisocyanate, p-phenylene diisocyanate, biphenyl 4, 4′ diisocyanate, meta-xylylene diisocyanate, toluene diisocyanate, 3,3′-dimethyl-4,4′-biphenylene diisocyanate, 1,4-tetramethylene diisocyanate, 1,6-hexamethylene diisocyanate, 2,2,4-trimethylhexane-1,6-diisocyanate, 1,3-bis-[2-(-(isocyanato)propyl]benzene (also known as tetramethylxylyldiisocyanate, available from American Cyanamide, Wayne, NJ as TMXDI ® Meta Aliphatic Isocyanate) methylene bis-(phenyl isocyanate), 1,5-naphthalene diisocyanate, bis-(isocyanatoethyl fumarate), methylene bis-(4-cyclohexyl isocyanate), and biurets or isocyanurates of any of these.

The polyfunctional compounds reactive with polyisocyanates may include any of diols, triols, or alcohols of higher functionality, such as ethylene glycol, propylene glycol, 1,4-butanediol, 1,6-hexanediol, neopentyl glycol, trimethylolethane, trimethylolpropane, pentaerythritol, polyester polyols, polyether polyols, and the like; polyamines, such as ethylene diamine and diethylene triamine; or aminoalcohols, such as diethanolamine and ethanolamine.

Preferably, one of either the polyisocyanate or the polyfunctional compound reactive with polyisocyanate has functionality (including latent functionality) greater than two. The reactants are apportioned so that the polyurethane copolymer has terminal isocyanate functionality and a weight average molecular weight preferably of at least 1000, and more preferably from 1000 to 20,000. The weight average molecular weight is determined by gel permeation chromatography using polystyrene standards.

Illustrative examples of isocyanate or latent isocyanate functional acrylics are copolymers of an ethylenically unsaturated monomer containing an isocyanate or latent isocyanate group. The copolymers may be prepared by addition polymerization using the methods and ethylenically unsaturated comonomers described hereinabove. The choice of monomers is not critical, so long as no monomer contains a group reactive with the isocyanate group. In a particularly preferred embodiment, the ethylenically unsaturated monomer containing an isocyanate group is meta-isopropenyl-a,a-dimethylbenzyl isocyanate. The free radical polymerization is usually carried out at temperatures from about 20° C. to about 200° C., preferably from 90° C. to 170° C., more preferably from 120° C. to 160° C. Generally, the amount of meta-isopropenyl-a,a-dimethylbenzyl isocyanate that may be incorporated into the addition polymer by free radical polymerization increases with increasing reaction temperature.

The isocyanate-functional polymeric backbone is adducted with both the pigment-interactive substituent, attached via the linking group —C(=O)—NR$_5$—, and the stabilizing substituent, attached via the linking group—C(=O)—NH—. The number of pigment-interactive substituents attached via the linking group —C(=O)—NR$_5$—is represented in the formula hereinabove by j, where j is an integer from one to fifty. Preferably, j is from 1 to 20; more preferably, j is from 1 to 10. An amount of the pigment-interactive substituent is included sufficient to firmly anchor the polymer to the surface of the pigment. This amount is dependent on factors such as the size and nature of the pigment particle, and can readily be determined by one skilled in the art.

The number of stabilizing substituents attached via the linking group —C(=O)—NH—is represented in the formula hereinabove by k, where k is an integer from one to fifty. Preferably, k is from 1 to 20; more preferably, k is from 1 to 10. The amount of the stabilizing substituent present is chosen to optimize the dispersibility of the inorganic pigment or the dispersibility and gassing resistance of the treated metallic flake pigment.

Silane pigment-interactive substituents of the invention are formed by reacting silane-containing materials having isocyanate-reactive groups with isocyanate groups of the polymeric backbone. The isocyanate-reactive groups are selected from hydroxyl, amino, mercapto, or oxirane functional groups. Examples of such materials useful for forming the substituents compatible with the above-mentioned requirements are 3-aminopropyltrimethoxysilane, 3-aminopropyltriethoxysilane, 3-(N-methylamino) propyltrimethoxysilane 3-mercaptopropyltrimethoxysilane, and (3-glycidoxypropyl)methyldiethoxysilane and the like. Preferred are amino-functional silanes, especially 3-aminopropyltrimethoxysilane, 3-aminopropyltriethoxysilane, and 3-(N-methylamino) propyltrimethoxysilane. Silane-containing materials that may be utilized in making the compounds of the invention are commercially available from, for example, Hüls America, Inc., Piscataway, NJ.; or from Dow Corning Corp., Midland, MI; or from Union Carbide Corp., Danbury, CT.

When the isocyanate-reactive groups on the silane-containing material are reacted with the isocyanate or latent isocyanate groups on the polymer backbone, the isocyanate-reactive groups are converted by the reaction to the radical D$_3$ and the isocyanate or latent isocyanate groups are converted to the linking group —C(=O)—NR$_5$—. A hydroxyl isocyanate-reactive group forms —O—as the radical D$_3$ and —C(=O)—NH—as the linking group. An amino isocyanate-reactive group forms as the radical D$_3$ and —C(=O)—NH—as the linking group. A mercapto isocyanate-reactive group forms —S—as the radical D$_3$ and —C(=O)—NH—as the linking group. An oxirane isocyanate-reactive group forms

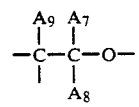

as the radical D3, and

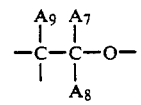

as the linking group, the two together forming the moiety

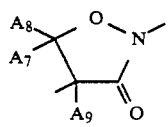

Phosphorous-containing pigment-interactive groups are attached to the polymeric backbone by reaction with a material containing a hydroxyl group and at least one other group capable of reacting with isocyanate or latent isocyanate functionalities on the polymeric backbone. The material containing these groups is a straight or branched compound of one to twelve carbon atoms. The group capable of reacting with isocyanate or latent isocyanate functionalities may be hydroxyl, amino, or mercapto; said groups forming by reaction radicals $D_3$ of —O—, —$NA_6$—, and —S—, respectively. Representative examples of useful materials are diols, triols, and higher functionality polyols, such as ethylene glycol, propylene glycol, butylene glycol, neopentyl glycol, trimethylolethane, trimethylolpropane, 1,6-hexanediol, and pentaerythritol; mercaptoalcohols, such as mercaptoethanol, mercaptopropanol, mercaptobutanol, mercaptophenol, or 3-mercapto-1,2-propanediol; and aminoalcohols, such as diethanolamine, methylethanolamine, and 6-amino-1-hexanol. Preferably, an amino group or hydroxyl group is chosen to react with the isocyanate. Aminoalcohols are particularly useful.

The aminoalcohol is first reacted with the isocyanate functional groups on the polymeric backbone. The amino group is more reactive to isocyanate than the hydroxyl group. The difference in reactivity is exploited to minimize any crosslinking between polymeric backbones. The reaction between amino and isocyanate groups may be accomplished under mild conditions, such as by stirring the two together for five minutes at room temperature.

The remaining alcohol group may be converted to the desired phosphate through various reaction schemes, such as reaction with polyphosphoric acid, phosphoric acid, phosphorous acid, or phosphorous pentoxide, or analogs that have phosphorous atoms monosubstituted with an alkyl of one to ten carbon atoms, an alkoxy of one to ten carbon atoms, an alkoxyalkoxy of two to ten carbon atoms, an alkanoyloxy of two to ten carbon atoms, or a halogen. One preferred method is by addition of polyphosphoric acid at temperatures between about 25° C. and about 200° C. Other well-known methods, using materials such as phosphorus pentachloride or phosphorus oxychloride, are available.

The stabilizing substituent comprises the Structure I, having both a polyester or polyamide residue ($D_1$ being —O— or —$NA_5$—, respectively) and an alkoxy poly(oxyalkylene) alcohol or alkoxy poly(oxyalkylene) amine residue ($D_2$ being —O— or —$NA_5$—, respectively). The stabilizing substituent is linked to the polymeric backbone through the linking group —C(=O)—NH—. The linking group is formed by the reaction of an isocyanate group with the polyester hydroxy group or the polyamide amino group.

The order in which the pigment-interactive and stabilizing substituents are reacted onto the polymeric backbone is not critical, and, in general, whether the two substituents are added simultaneously or sequentially will depend upon the particular functionalities chosen. In the case of latent isocyanate groups, such as blocked isocyanate groups, the conditions must allow the generation of the isocyanate functionality. The reactions of forming the pigment-interactive and stabilizing substituents and adducting them onto the polymeric backbone may be done neat or in solution. Addition of an inert solvent is preferred when the viscosity would otherwise be too high to achieve adequate mixing. Solvents containing hydroxyl groups and other active hydrogens are not preferred. Useful solvents include aromatic and aliphatic hydrocarbons, esters, ethers, and ketones.

Such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents may be useful.

In one preferred embodiment, the compound of the invention is used disperse an inorganic, nonmetallic pigment or to modify the surface of metallic particles for use in aqueous coating compositions, particularly waterborne basecoat compositions.

When the dispersant molecule is used with an inorganic pigment it is usually preferable to use only one kind of dispersant molecule, either one where the pigment-interactive substituent is the silane or one where the pigment-interactive substituent is the phosphorous-containing functionality, preferably the latter.

When the dispersant molecule is used with a metallic flake pigment, the dispersant molecule may again be only one kind, as with the inorganic pigments. However, here it is particularly advantageous to use together a dispersant molecule having the silane functionality and a dispersant molecule having the phosphorous-containing functionality.

The inorganic, nonmetallic pigments commonly used in coatings vary widely in chemical composition, and for a particular chemical composition may vary according to crystal structure, types and levels of impurities, or otherwise. Before being added to a coating composition, the pigments must first be dispersed, and often ground to a finer particle size using methods well-known to the art.

Flake pigments such as mica flake pigments may be dispersed and stabilized by merely stirring the flake pigment together with the dispersant compound in a solvent, preferably at room temperature, for a period of time, preferably from 5 minutes to 2 hours. Preferably, the solvent is water or a water compatible solvent. The solvent may be, for example, a glycol ether, glycol ether acetate, ester, water, or combination of these. Sufficient solvent is used to allow the dispersion to be well-mixed during its preparation.

In a preferred embodiment the pigment-interactive substituent on the dispersant compound is a phosphorous-containing substituent.

The flake pigments may be dispersed using a pigment to binder ratio of up to 100; that is, the weight of the flake pigment in the dispersion may be up to one hundred times that of the weight of the dispersant compound used.

When inorganic pigments are used that are not flake pigments, it is normally necessary that the pigments be ground in the presence of the dispersant compound. The grinding may be done using methods and equipment known to the art. A basic discussion is provided in Federation Series On Coatings Technology, Unit Sixteen: Dispersion and Technology, Phil. PA, 1970), incorporated herein by reference.

Preferably, a premix is first prepared by stirring together the pigment to be ground, the dispersant compound and solvent. Preferably, the solvent is water or a water compatible solvent. The solvent may be, for example, a glycol ether, glycol ether acetate, ester, water, or combination of these. The solvent is preferably a mixture of water and a glycol ether or a glycol ether acetate. A particularly preferred mixture is 50–98% water with the balance being a glycol ether. A sufficient amount of solvent is used to produce a final paste of workable viscosity. The appropriate amount is dependent on the type of pigment to be ground, and can readily be determined by one skilled in the art. As a guideline, it is necessary to use more solvent for pigments having higher surface areas. A pigment paste of a high surface area pigment may have a 10-25% solids content, whereas a low surface area pigment may be made into a paste having 60% or more solids content.

The pigment to binder ratio used in preparing pigment pastes of inorganic pigments likewise varies according to the pigment and is readily determined by one skilled in the art. For example, a formulation having too high of a pigment to binder ratio results in an unworkable viscosity during the grinding process. A pigment having a high surface area may require at least 1 part by weight of the dispersant compound per 3 parts by weight of the pigment (pigment to binder ratio=3). A pigment having low surface area may require only 1 part by weight of the dispersant compound per 50-100 parts by weight of the pigment (pigment to binder ratio=50-100). Preferably, the pigment-interactive substituent on the dispersant compound is a phosphorous-containing substituent.

After the premix is prepared, it is ground to reduce the pigment to the desired particle size. The grinding may be accomplished by introducing the pigment into a grinding mill, such as a horizontal mill, a roller mill, a ball or pebble mill, a sand mill, or an attritor. Horizontal mills, such as the kind manufactured by Eiger Machinery, Inc., Bensenville, Ill., are very efficient for producing pigment pastes of the instant invention. The grinding in the grinding mill is continued until the desired particle size is obtained.

The compound of the invention may also be used to modify the surface of metallic particles. The metallic particles may be aluminum, gold bronze (copper-zinc alloys), copper, nickel, brass, magnesium, zinc, and alloys of these. Preferably, the metallic particles are aluminum, gold bronze, brass, and zinc. Aluminum is particularly preferred.

Aluminum particles as contemplated for use with the invention generally have a surface area that may range from about 0.05 to about 15 m$^2$/g of aluminum. The aluminum particles that are specifically contemplated as preferred aspects of the invention are aluminum flakes, powders and granules. Aluminum flake pigments are particularly preferred in the waterborne basecoat compositions. In a preferred aspect, the surface area of the aluminum is from about 2 to about 14.5 m$^2$/g. The average particle size of the aluminum flake pigment is preferably from 1 to 70 microns, more preferably from 5 to 50 microns.

The metallic particles, such as aluminum flake pigment, used in the present invention and their methods of manufacture are well-known in the art. Commercial aluminum flake pigment pastes are available from companies such as Silberline, Tamaqua, PA; Aluminum Company of America, Pittsburgh, PA; Obron Atlantic Corp., Painesville, OH; Reynolds Metals Company, Richmond, VA; and Toyo Aluminum KK, Higashiku, Osaka, Japan in various grades, types and particle sizes. For certain waterborne paint applications, such as automotive basecoats, non-leafing aluminum flake pigments, such as Sparkle Silver ® 5245 AR aluminum paste from Silberline or 8160 AR aluminum paste from Obron, have been utilized.

The compounds of the invention may be added during manufacture of the metallic flake pigment paste or added thereafter. The compounds of the invention are effective for surface modification of the metallic flake pigment at levels of from 1% to 20%, preferably from 4% to 15%, and more preferably from 5% to 10%, based on the weight of the metallic flake pigment. It is particularly advantageous to use two embodiments of the invention in combination for treating the metallic flake pigment; one compound where X is

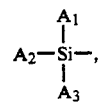

and the other compound where X is

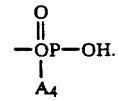

The effects of the two embodiments used together are thought to be beneficial because of different modes of interaction with metal surfaces. When the two embodiments described are used together, it is preferred to use approximately equal molar amounts of each. The silane-containing compound and the phosphorous-containing compound may be used at levels from 0.5% to 10% each, based on the weight of the metallic flake pigment; but it has been found that from 2.5% to 5% each of the silane-containing compound and the phosphorous-containing compound (based on the weight of the metallic flake pigment) is particularly useful for treating metallic flake pigment.

It is particularly useful in some cases to include tris (p-isocyanato-phenyl)-thiophosphate when treating the metallic flake pigment with the compounds of the invention. Use of tris (p-isocyanato-phenyl)-thiophosphate is described in U.S. Pat. No. 5,156,677.

A solvent may be used for ease of processing when the compounds of the invention are added to the metallic flake pigment paste. Preferably, the solvent is water compatible. The solvent may be, for example, a glycol ether, glycol ether acetate, ester or combination of these. It has been found to be particularly advantageous to employ a solvent that is less aggressive toward the metallic flake pigment. Glycol ethers or glycol ether acetates are preferred for this use, particularly propylene glycol methyl ether acetate. In some instances, it may be useful to add a minor amount of water to the solvent or solvent mixture.

The dispersed inorganic pigments and surface-modified metallic flake pigments are useful in aqueous compositions. They may be combined with one or more film-forming resins and water to form a waterborne paint composition. Other ingredients well-known in the art to be useful in such compositions may be included, such as crosslinkers and other resins; plasticizers; additional cosolvents to aid in stabilization or application of the composition; rheology control agents; other pigments; UV light stabilizers; antioxidants; catalysts; fungicides, and so on.

Suitable film-forming resins are water-dispersible or water-soluble ionic or nonionic resins. Anionic or nonionic resins are preferred for use in topcoat applications. The resins may be acrylic, vinyl, polyurethane, polyester, alkyd, epoxy, or other polymers known to be useful in films. Examples of water-dispersible polymers used for topcoats are contained in U.S. Pat. Nos. 4,794,147; 4,791,168; and 4,518,724, all of which are incorporated herein by reference. Such systems typically also include a crosslinker, such as aminoplast resins, polyamines, blocked polyisocyanates, and so on, depending on the functionality available for crosslinking on the film forming resin. For example, hydroxyl-functional acrylic or polyurethane resins can be cured using aminoplast resins. For this purpose, melamine-formaldehyde resins are particularly preferred. Melamine-formaldehyde resins of the kind contemplated are commercially available from, for example, Monsanto Co., St. Louis, MO; and American Cyanamid, Wayne, NJ. A polymeric-type melamine may be used, particularly when the film forming resin is anionically stabilized. Such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

The film-forming resin or the crosslinker may comprise functionality that can react with a reactive group on the compound of the invention during the curing step. The polymeric network formed during cure would then include a residue of the compound, covalently bonded to the polymeric network. The ability of the compound to react during the curing step is independent of its function in surface modifying the metallic flake pigment or dispersing an inorganic pigment.

Additional cosolvents may be added to aid in stabilization or application of the composition. The more preferred solvents are acetates such as butyl acetate, hexyl acetate, and octyl acetate; glycol ethers and glycol ether acetates, such as propylene glycol monomethyl ether and propylene glycol monomethyl ether acetate; and ketones, such as methyl propyl ketone, methyl isobutyl ketone, and methyl hexyl ketone. Glycol ethers and glycol ether acetates are especially preferred.

Inorganic pigments dispersed according to the present invention are typically used in amounts of 1% to 200%, based on the total solid weight of the reactants. The word 'reactants' is used here to encompass film-forming resins, including crosslinkers, and any other species that reacts and is incorporated into the polymeric network formed during curing of the coating. The surface-modified metallic flake pigments used according to the invention are typically used in amounts of 1% to 30%, based on the total solid weight of the reactants. Other pigments (eg, organic pigments), if used, are preferably incorporated as pastes or dispersions prepared by using grinding resins or pigment dispersants according to methods known in the art and used in an amount of 1% to 200%, based on the total solid weight of the reactants.

It may be desirable to include small amounts of rheology control agents, for example associative thickeners, fumed silicas, hectorite clays, bentonite clays, or cellulosics like cellulose acetate butyrate. Such materials are usually used at levels of less than 10% based on the total solid weight of reactants. Rheology control agents are used to control the flow and levelling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

The prepared coating composition is applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 62 siphon spray gun (available from Binks Manufacturing Corp., Franklin Park, Ill.) with 50-80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited to use over primed automotive substrates as topcoat formulations or basecoat formulations that are overcoated with clearcoat formulations.

After application of the coating composition to the substrate, the coating is cured, preferably by heating at a temperature and for a length of time sufficient to cause the reactants to form an insoluble polymeric network. The cure temperature is usually from 115° C. to 180° C., and the length of cure is usually 15 minutes to 60 minutes. Preferably, the coating is cured at 120°–150° C. for 20 to 30 minutes. The thickness of the cured coating can be from 1 to 150 microns, but when used as an automotive topcoat or basecoat the coating thickness is generally from 10 to 70 microns.

In a preferred embodiment of the invention, the coating composition of the present invention is used as a basecoat and is overcoated with a transparent topcoat layer, known commonly in the art as a clearcoat. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat may be a coating composition according to this invention or another composition known to the art to have utility as a clearcoat. The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1–20 minutes. The uncured coatings are then cured, usually by thermoset methods as described hereinabove. The resulting appearance and physical properties are excellent.

The following examples are provided to further illustrate the invention.

EXAMPLES 1-5

Preparation of Silane- and Phosphate-Functional Compounds

Example 1. Preparation of Phosphate-Functional Compound

Part A. Synthesis of Polymeric Backbone

A reactor was charged with 215.0 grams of methyl amyl ketone and heated with stirring to reflux (151° C.). A mixture of 301.9 grams of TMI ® (American Cyanamid Company, Wayne, NJ), 52.1 grams styrene, 213.3 grams butyl methacrylate, 192.3 grams butyl acrylate, and 76.0 grams of t-butyl peracetate (50% by weight solution in aromatic solvent) was then added over a period of about 3 hours, all the while maintaining the reactor contents at reflux. The reflux temperature at the end of the add was 154° C., and the reflux was held for another 30 minutes. A mixture of 57.3 grams of methyl amyl ketone and 38.0 grams of t-butyl peracetate (50% by weight solution in aromatic solvent) was added over a period of 25 minutes. The reaction was held at reflux for an hour and a half following the final add. The product had a solids content of 69.9% and a measured isocyanate content of 1.23 milliequivalents per gram (meq/g).

Part B. Synthesis of the Polyester/Polyether Substituent

A reactor was charged with 260.8 grams of MPEG 2000 (methoxypolyethylene glycol, molecular weight 2000, obtained from BASF Corp., Wyandotte, MI), 521.6 grams e-caprolactone, and 1.7 grams phosphoric acid. The mixture was held at 139°-200° C. for about four hours. At the end of the hold, the measured nonvolatiles were 99.7%.

Part C. Synthesis of Phosphate-Functional Compound

A reactor was charged with 618.0 grams of the polymeric backbone from Part A and 432.0 grams of the polyester/polyether substituent from Part B. The theoretical starting isocyanate content was 0.72 meq/g. The contents of the flask were held reflux (172°-175° C.) until the isocyanate content measured 0.56 meq/g. The reaction mixture was then cooled to 101° C., and 35.9 grams of ethanolamine were added. An exotherm increased the temperature to 114° C. After five minutes the reaction mixture was cooled to 40° C., and then 37.9 grams of polyphosphoric acid and 372.4 grams toluene were added. The contents of the reactor were heated to reflux (125° C) and held at reflux for 35 minutes. The nonvolatiles were measured at 62.5%.

Example 2. Preparation of Phosphate-Functional Compound

Part A. Synthesis of Polymeric Backbone

A reactor was charged with 215.0 grams of methyl amyl ketone and heated with stirring to reflux (150° C.). A mixture of 301.9 grams of TMI ® (American Cyanamid Company, Wayne, NJ), 52.1 grams styrene, 213.3 grams butyl methacrylate, 192.3 grams butyl acrylate, and 76.0 grams of t-butyl peracetate (50% by weight solution in aromatic solvent) was then added over a period of about 3 hours, all the while maintaining the reactor contents at reflux. The reflux temperature at the end of the add was 151° C., and the reflux was held for another 30 minutes. A mixture of 57.3 grams of methyl amyl ketone and 38.0 grams of t-butyl peracetate (50% by weight solution in aromatic solvent) was added over a period of 20 minutes. The reaction was held at reflux for an hour and a half following the final add. The product had a solids content of 69.8% and a measured isocyanate content of 1.22 milliequivalents per gram (meq/g).

Part B. Synthesis of Hydroxy-Functional Compound

A reactor was charged with 303.7 grams of the polymeric backbone from Part A and 70.7 grams of MPEG 2000 (molecular weight 2000, obtained from BASF Corp., Wyandotte, MI). The theoretical starting isocyanate content was 0.88 meq/g. After the contents of the flask were heated to 139° C., 2.1 grams of a solution of dibutyl tin dilaurate (1% by volume in methyl propyl ketone) were added. The reaction mixture was further heated to 165° C. over another half hour, then cooled to 51° C. The isocyanate content measured 0.72 meq/g. 16.5 grams of ethanolamine were added, with an exothermic temperature increase to 73° C. The mixture was stirred for another 20 minutes. The nonvolatiles were measured at 75.9%. The theoretical hydroxyl content was 0.685 meq/gram.

Part C. Synthesis of Phosphate-Functional Compound

A reactor was charged with 183.0 grams of the compound of Part B, 8.1 grams of polyphosphoric acid, and 53.9 grams of toluene. The material was heated to 124° C., then heated for another hour with the temperature increasing to 128° C. The nonvolatiles were measured at 60.3%.

Example 3. Preparation of Silane-Functional Compound

Part A. Synthesis of Polymeric Backbone

The polymeric backbone was prepared according to the directions given in Example 2, Part A.

Part B. synthesis of Silane-Functional Compound

A reactor was charged with 145.4 grams of the polymeric backbone from Part A and 33.7 grams of MPEG 2000 (molecular weight 2000, obtained from BASF Corp., Wyandotte, MI). The theoretical starting isocyanate content was 0.89 meq/g. After the contents of the flask were heated to 157° C., 1.0 gram of a solution of dibutyl tin dilaurate (1% by volume in methyl propyl ketone) was added. The reaction mixture was further heated to 169° C. over another half hour, then cooled to 55° C. The isocyanate content measured 0.72 meq/g. 2.86 grams of aminopropyl trimethyoxysilane were added and stirred for 5 minutes, followed by addition of 7.1 grams of ethanolamine and 10 more minutes of stirring. The nonvolatiles were measured at 76.1%.

Example 4. Preparation of Phosphate-Functional Compound

Part A. Synthesis of Polymeric Backbone

A reactor was charged with 219.6 grams of methyl amyl ketone and heated with stirring to reflux (152° C.). A mixture of 301.9 grams of TMI ® (American Cyanamid Company, Wayne, NJ), 248.9 grams butyl methacrylate, 224.3 grams butyl acrylate, and 77.5 grams of t-butyl peracetate (50% by weight solution in aromatic solvent) was then added over a period of about 3 hours, all the while maintaining the reactor contents at reflux. The reflux temperature at the end of the add was 151° C., and the reflux was held for another 45 minutes. A mixture of 58.4 grams of methyl amyl ketone and 38.8 grams of t-butyl peracetate (50% by weight solution in aromatic solvent) was added over a period of 25 minutes. The reaction was held at reflux for an hour and a half following the final add. The product had a solids content of 69.4%.

Part B. Synthesis of Hydroxy-Functional Compound

A reactor was charged with 759.9 grams of the polymeric backbone from Part A and 228.0 grams of MPEG 2000 (molecular weight 2000, obtained from BASF Corp., Wyandotte, MI). The theoretical starting isocyanate content was 0.887 meq/g. After the contents of the flask were heated to 113° C., 5.32 grams of a solution of dibutyl tin dilaurate (1% by volume in methyl propyl ketone) were added. The reaction mixture was further heated to 159° C. over another 45 minutes, then cooled to 51° C. The isocyanate content measured 0.700 meq/g. 42.5 grams of ethanolamine were added, with an exothermic temperature increase to 78° C. The mixture was stirred for another 15 minutes. The theoretical nonvolatiles were 77.5%. The theoretical hydroxyl content was 0.671 meq/gram.

Part C. Synthesis of Phosphate-Functional Compound

A reactor was charged with 725.0 grams of the compound of Part B, 22.9 grams of 85% phosphoric acid, and 95.7 grams of toluene. The material was heated to reflux (122)° C., then held at reflux for another four hours with the removal of the water by-product as it was formed. The temperature increased to 131° C. The nonvolatiles were 62.5%.

Example 5. Preparation of Silane-Functional Compound

Part A. Synthesis of Silane-Functional Polymer

A reactor was charged with 108.7 grams of xylene and heated with stirring to reflux (137° C.). A mixture of 5.9 grams of TMI® (American Cyanamid Company, Wayne, NJ), 106.7 grams butyl methacrylate, 96.1 grams butyl acrylate, 26.0 grams styrene, 18.6 grams gamma-methacryloxypropyltrimethoxysilane, and 38.3 grams of t-butyl peracetate (50% by weight solution in aromatic solvent) was then added over a period of about 3 hours, all the while maintaining the reactor contents at reflux. The reflux temperature at the end of the add was 152° C., and the reflux was held for another 30 minutes. A mixture of 26.9 grams xylene and 19.7 grams of t-butyl peracetate (50% by weight solution in aromatic solvent) was added over a period of 30 minutes. The reaction was held at reflux for an hour and a half following the final add. The product had a solids content of 69.4% and an isocyanate content of 1.118 meq/gram.

Part B. Synthesis of the Polyester/Polyether Substituent

A reactor was charged with 400.1 grams of MPEG 2000 (molecular weight 2000, obtained from BASF Corp., Wyandotte, MI), 779.6 grams e-caprolactone, and 0.2 grams phosphoric acid. The mixture was held at 140° C. for about twelve hours.

Part C. Synthesis of Silane-Functional Dispersant Compound

A reactor was charged with 151.7 grams of the polymer from Part A and 151.4 grams of the polyester/polyether from Part B. The theoretical starting isocyanate content was 0.560 meq/g. After the contents of the flask were heated to 116° C., 1.06 grams of a solution of dibutyl tin dilaurate (1% by volume in methyl propyl ketone) were added. The reaction mixture was held at about 120° C. for an hour and a half, then cooled to 75° C. The isocyanate content measured 0.425 meq/g. 7.9 grams of ethanolamine were added, with an exothermic temperature increase to 87° C. 61.6 grams of toluene were added. The nonvolatile content

Examples 6-10
Preparation of Pigment Dispersions

Example 10. Preparation of Dispersion of Red Iron Oxide

A premix was prepared from a mixture of 187.5 grams of red iron oxide (obtained from Pfizer Pigments Inc., New York, NY), 20.0 grams of the dispersant compound of Example 1, 270.0 grams of deionized water, and 22.5 grams of 2-butoxyethanol. The mixture was agitated at high speed for 30 minutes. The premix was then charged into an Eiger Mini 250 mill (Eiger Machinery, Inc., Bensenville, Ill.) and ground at 3000 rpm for 60 minutes. An addition to the mill of 10.0 grams of the dispersant compound of Example 1, 74.7 grams of deionized water, and 4.6 grams of 2-butoxyethanol was made. The paste was ground in the mill 30 minutes longer. The particle size was then less than 6 microns.

Example 11. Preparation of Dispersion of Titanium Dioxide

A premix was prepared from a mixture of 250.0 grams of titanium dioxide ("TI-PURE"®, obtained from DuPont, Wilmington, DE), 16.7 grams of the dispersant compound of Example 2, 234.0 grams of deionized water, and 19.3 grams of 2-butoxyethanol. The mixture was agitated at high speed for 15 minutes. The premix was then ground in an Eiger mill as described in Example 10 for 15 minutes. The particle size was then less than 6 microns.

Example 12. Preparation of Dispersion of Red Iron Oxide

A premix was prepared by stirring together 12.8 grams of the dispersant compound of Example 2, 270.0 grams of deionized water, and 24.9 grams of 2-butoxyethanol for 15 minutes, then adding 192.3 grams of red iron oxide (obtained from Pfizer Pigments Inc., New York, NY). The premix was then ground in an Eiger mill as described in Example 10 for minutes. The particle size was then less than 6 microns.

Example 13. Preparation of Dispersion of Transparent Red Iron Oxide.

A premix was prepared by stirring together 27.8 grams of the dispersant compound of Example 2, 270.0 grams of deionized water, and 18.9 grams of 2-butoxyethanol for 30 minutes. 83.3 grams of transparent red iron oxide (L2715, obtained from BASF Corp.) were then added and the mixture stirred 30 minutes longer. The premix was then ground in an Eiger mill as described in Example 10 for 4 hours. The particle size was then less than 6 microns.

Example 14. Preparation of Dispersion of Titanium Dioxide

A premix was prepared by first dissolving 16.4 grams of the dispersant compound of Example 3 in 26.1 grams of 2-butoxyethanol, then mixing in 270.0 grams of deionized water, and finally adding 187.5 grams of titanium dioxide ("TI-PURE"®, obtained from DuPont, Wilmington, DE). This mixture was agitated at high speed for 15 minutes. The premix was then ground in an Eiger mill as described in Example 10 for 45 minutes. The particle size was then less than 6 microns.

Example 15. Preparation of Dispersion of Red Iron Oxide

A premix was prepared by stirring together 11.4 grams of the dispersant compound of Example 4, 207.5 grams of deionized water, and 18.2 grams of 2-butoxyethanol, then adding 142.9 grams of red iron oxide (obtained from Pfizer Pigments Inc., New York, NY) and stirring the mixture for 30 minutes. The premix was then ground with 2300 grams steel shot in a 1000 ml attritor for 30 minutes. The particle size was then less than 6 microns.

The invention has been described in detail, with reference to specific embodiments thereof. It is to be understood that modifications and variations may be made within the spirit and scope of the invention.

What is claimed is:

1. A compound, comprising a polymeric backbone, having a pigment-interactive substituent and a stabilizing substituent;
   wherein the pigment-interactive substituent has at least one functionality selected from the group consisting of

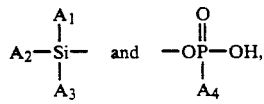

wherein $A_1$, $A_2$, $A_3$, and $A_4$ are each independently
hydroxy,
alkyl of one to ten carbon atoms,
alkoxy of one to ten carbon atoms,
alkoxyalkoxy of two to ten carbon atoms,
alkanoyloxy of two to ten carbon atoms, or
halogen,
with the proviso that $A_1$, $A_2$, and $A_3$ may not all be alkyl; and
wherein the stabilizing substituent comprises the structure

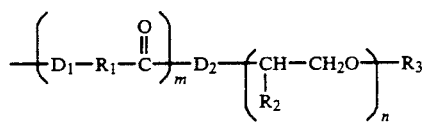

wherein
$D_1$ and $D_2$ are divalent radicals, each independently —O— or —$NA_5$—,
   wherein $A_5$ is hydrogen or alkyl of one to twelve carbon atoms;
$R_1$ is a divalent radical selected from straight or branched alkylenes of three to thirty carbon atoms;
$R_2$ is hydrogen or a mixture of hydrogen and alkyl of one to eight carbon atoms;
$R_3$ is an alkyl of one to thirty carbon atoms;

m is an integer from zero to one thousand, and
n is an integer from one to one thousand.

2. A compound as described in claim 1, of the formula:

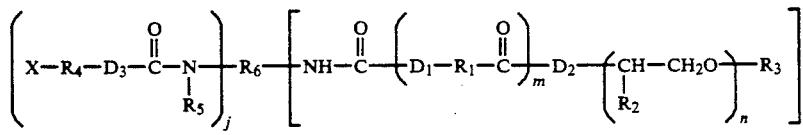

wherein
$D_1$, $D_2$, $R_1$, $R_2$, $R_3$, m, and n are as defined in claim 1; and wherein X is either

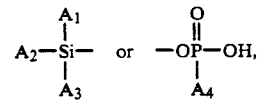

wherein $A_1$, $A_2$, $A_3$, and $A_4$ are as defined in claim 1;
$R_4$ is a divalent radical selected from straight or branched alkylenes of one to twelve carbon atoms;
$D_3$ is either a divalent radical selected from the group consisting of —O—, —$NA_6$—, and —S—, or a trivalent radical of the formula

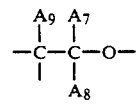

wherein $A_6$, $A_7$, $A_8$ and $A_9$ are each independently hydrogen or alkyl of one to twelve carbon atoms;
$R_5$ is hydrogen or a covalent bond with $D_3$, with the proviso that $R_5$ is only a covalent bond with $D_3$ when $D_3$ is a trivalent radical;
$R_6$ is the polymeric backbone; and
j and k are integers, each independently being one to fifty.

3. A coating composition, comprising a compound according to claim 1 and an inorganic pigment.

4. A coating composition as described in claim 3, further comprising water.

5. A coating composition, comprising a compound according to claim 2 and an inorganic pigment.

6. A coating composition as described in claim 5, further comprising water.

7. A coating composition as described in claim 5, wherein the $D_1$ and the $D_2$ are each —O—, and wherein the $D_3$ is either —O— or —NH—.

8. A coating composition according to claim 5, wherein the $R_6$ is an acrylic polymeric backbone.

9. A coating composition as described in claim 8, wherein the molecular weight of the acrylic polymeric backbone is from 2000 to 50,000.

10. A coating composition as described in claim 5, wherein the m is from 0 to 20 and the n is from 40 to 70.

11. A coating composition as described in claim 5, wherein the $R_2$ is hydrogen and the $R_3$ is methyl.

12. A coating composition as described in claim 5, wherein the j and k are each independently from 1 to 10.

13. A coating composition as described in claim 5, wherein the m is 0.

14. A coating composition according to claim 5 wherein X is

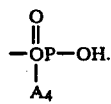

15. A coating composition as described in claim 14, wherein the $A_4$ is hydroxy.

16. A compound as described in claim 1, wherein the pigment-interactive substituent is incorporated into the compound by copolymerization of an ethylenically unsaturated group.

17. A compound as described in claim 1, wherein the stabilizing substituent is incorporated into the compound by copolymerization of an ethylenically unsaturated group.

18. A coating composition, comprising a compound according to claim 1 and a metallic particle, with the proviso that m is at least one.

19. A coating composition as described in claim 18, wherein the metallic particle is a metallic flake pigment.

20. A coated article, comprising a substrate having thereon the coating composition according claim 3.

21. A coated article, comprising a substrate having thereon the coating composition according claim 19.

* * * * *

UNITED STATES PATENT AND TRADEMARK OFFICE
CERTIFICATE OF CORRECTION

PATENT NO. : 5,320,673
DATED : June 14, 1994
INVENTOR(S) : Clints W. Carpenter

It is certified that error appears in the above-indentified patent and that said Letters Patent is hereby corrected as shown below:

On the title page:

[73] Assignee: BASF Corporation
26701 Telegraph Road
Southfield, MI 48086-5009

Signed and Sealed this

Seventh Day of February, 1995

Attest:

BRUCE LEHMAN

*Attesting Officer*  *Commissioner of Patents and Trademarks*